(12) United States Patent
Dezeustre et al.

(10) Patent No.: US 9,279,385 B2
(45) Date of Patent: Mar. 8, 2016

(54) NACELLE FOR AN AIRCRAFT BYPASS TURBOJET ENGINE

(71) Applicant: AIRCELLE, Gonfreville l'Orcher (FR)

(72) Inventors: Nicolas Dezeustre, Le Havre (FR); Patrick Stella, Les Mesnuls (FR)

(73) Assignee: AIRCELLE, Gongreville l'Orcher (FR)

( * ) Notice: Subject to any disclaimer, the term of this patent is extended or adjusted under 35 U.S.C. 154(b) by 241 days.

(21) Appl. No.: 14/093,928

(22) Filed: Dec. 2, 2013

(65) Prior Publication Data
US 2014/0086738 A1    Mar. 27, 2014

Related U.S. Application Data

(63) Continuation of application No. PCT/FR2012/051045, filed on May 11, 2012.

(30) Foreign Application Priority Data
Jun. 1, 2011  (FR) .................................... 11 54809

(51) Int. Cl.
 *F02K 1/12*  (2006.01)
(52) U.S. Cl.
 CPC .................. *F02K 1/12* (2013.01); *F02K 1/1207* (2013.01); *F02K 1/1223* (2013.01); *F05D 2260/52* (2013.01); *F05D 2300/501* (2013.01); *Y02T 50/671* (2013.01)
(58) Field of Classification Search
 CPC ........ F02K 1/1207; F02K 1/1223; F02K 1/12
 See application file for complete search history.

(56) References Cited

U.S. PATENT DOCUMENTS

| | | | | |
|---|---|---|---|---|
| 4,466,573 A | * | 8/1984 | Camboulives | F02K 1/1207 239/265.41 |
| 5,141,154 A | * | 8/1992 | Barcza | F02K 1/1223 239/127.3 |
| 2004/0187476 A1 | * | 9/2004 | Lair | B64D 33/04 60/226.1 |
| 2009/0072049 A1 | * | 3/2009 | Swanson | F02K 1/1223 239/265.37 |

(Continued)

FOREIGN PATENT DOCUMENTS

FR     2 887 854 A1    1/2007
FR     2 929 998 A1    10/2009

OTHER PUBLICATIONS

International Search Report issued in International Application PCT/FR2012/051045.

*Primary Examiner* — Gerald L Sung
*Assistant Examiner* — William Breazeal
(74) *Attorney, Agent, or Firm* — Brinks Gilson & Lione

(57) ABSTRACT

A nacelle for an aircraft bypass turbojet engine includes downstream, an internal stationary structure surrounding part of the bypass turbojet engine, and an external structure surrounding the internal stationary structure, defining an annular flow path along which an air flow circulates. The external structure includes a mobile flap disposed at the downstream end of the external structure and positioned facing the annular flow path. Each mobile flap can rotate such as to move into a position that increases or reduces the height of the cross-section of the annular flow path in relation to an idle position, in response to the pressure exerted on the mobile flap by the air flow circulating through the facing annular flow path. The mobile flap can return from the cross-section-increasing or -reducing position to another position under the effect of an elastic return means.

10 Claims, 6 Drawing Sheets

(56) References Cited

U.S. PATENT DOCUMENTS

2009/0090817 A1  4/2009  Monka
2010/0018212 A1*  1/2010  Core ..................... B64D 33/06 60/771

* cited by examiner

NACELLE FOR AN AIRCRAFT BYPASS TURBOJET ENGINE

CROSS-REFERENCE TO RELATED APPLICATIONS

This application is a continuation of International Application No. PCT/FR2012/051045, filed on May 11, 2012, which claims the benefit of FR 11/54809, filed on Jun. 1, 2011. The disclosures of the above applications are incorporated herein by reference.

FIELD

The present disclosure relates to a nacelle for an aircraft bypass turbojet engine.

BACKGROUND

The statements in this section merely provide background information related to the present disclosure and may not constitute prior art.

An aircraft is moved by several turbojet engines each housed in a nacelle also housing a set of related actuating devices connected to its operation and performing various functions when the turbojet engine is running or stopped. These related actuating devices in particular comprise a mechanical thrust reverser actuating system.

A nacelle generally has a tubular structure along a longitudinal axis comprising an air inlet upstream from the turbojet engine, a midsection intended to surround a fan of the turbojet engine, and a downstream section housing the thrust reverser means and intended to surround the combustion chamber of the turbojet engine. The tubular structure generally ends with a jet nozzle, the outlet of which is situated downstream from the turbojet engine.

Modern nacelles are intended to house a bypass turbojet engine capable of generating, by means of the rotating fan blades, a hot air flow (also called "primary flow") coming from the combustion chamber of the turbojet engine, and a cold air flow ("secondary flow"), that circulates outside the turbojet engine through an annular passage, also called "annular flow path".

The term "downstream" here refers to the direction corresponding to the direction of the cold air flow penetrating the turbojet engine. The term "upstream" designates the opposite direction.

The annular flow path is formed in a downstream section by an outer structure, called outer fixed structure (OFS), and a concentric inner structure, called inner fixed structure (IFS), surrounding the structure of the engine strictly speaking downstream from the fan. The inner and outer structures are part of the downstream section. The outer structure may include one or more cowls sliding along the longitudinal axis of the nacelle between a position allowing the reversed airflow to escape and a position preventing such an escape.

A variable-section nozzle at the outlet of the annular flow path is formed by movable elements configured so as to allow a decrease or increase in the discharge section of the air flow at the outlet of the annular flow path so as to optimize the section of the latter based on the flight phase of the aircraft.

However, the devices for actuating said movable elements are cumbersome and make the nacelle heavier.

SUMMARY

The present disclosure provides a nacelle for an aircraft bypass turbojet engine, comprising downstream, an inner fixed structure intended to surround part of the bypass turbojet engine, and an outer structure at least partially surrounding the inner fixed structure, so as to define an annular flow path along which an air flow circulates, the outer structure comprising at least one movable flap positioned at the downstream end of the outer structure and positioned facing the annular flow path, each movable flap being able to rotate so as to move into a position that increases or reduces the height of the cross-section of the annular flow path in relation to an idle position, only in response to the pressure exerted on the movable flap by the air flow circulating through the facing annular flow path, said movable flap being able to return from the aforementioned cross-section-increasing or -reducing position to another position under the effect of an elastic return means.

Owing to the nacelle according to the present disclosure, the movable flap(s) allow the cross-section of the downstream end of the annular flow path, commonly called "variable section nozzle", to have a variable height without a cumbersome or heavy actuating device. In fact, said movable flaps are able to go from one position to another solely under the effect of the pressure exerted by the air flow circulating in the annular flow path.

The present disclosure therefore obtains a variable section nozzle simply, effectively, inexpensively and compactly.

According to other features of the present disclosure, the nacelle includes one or more of the following optional features, considered alone or according to any technically possible combination(s):

- the elastic return means are positioned at the upstream end at the pivot axis of the movable flap(s), which allows good pivoting of each movable flap;
- the elastic return means comprise one or more springs configured to oppose the momentum exerted by the pressure of the air flow in the annular flow path, which simply and reliably allows proper positioning of each flap;
- the elastic return means include two springs placed in opposition so as to obtain a desired stiffness;
- the elastic return means comprise two springs placed in parallel, which makes it possible to obtain, depending on the stiffness of each spring, a variable section nozzle with three or more positions;
- the spring(s) comprise one or more torsion spring(s);
- the spring(s) comprise a torsion bar;
- one or more movable flaps are made from a shape memory material, chosen from among a family of existing superelastic alloys, in particular such as Nitinol, alloy of Nickel and Titanium, or future alloys, etc., which makes it possible to avoid resistance torque at the elastic return means and to limit the sensitivity of the movable flaps to gale-type winds; reference may in particular be made to document US 2011/003038891;
- each movable flap is associated with one or more radial stops positioned so as to limit the angular movements of said movable flap;
- the nacelle further includes blocking means configured to block a movable flap in at least one of the increasing and reducing positions;
- at least one part of a movable flap is substantially covered by a part of the outer structure, which makes it possible to increase the size of the movable flap and therefore facilitate its rotation; and
- the upstream end of one movable flap is fixed to the downstream end of another movable flap, the two movable flaps being aerodynamically continuous.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 13:
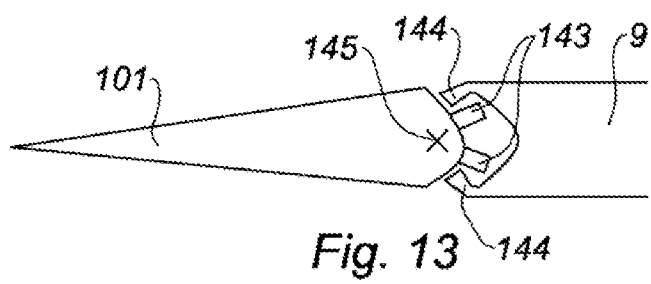
Figure 14:
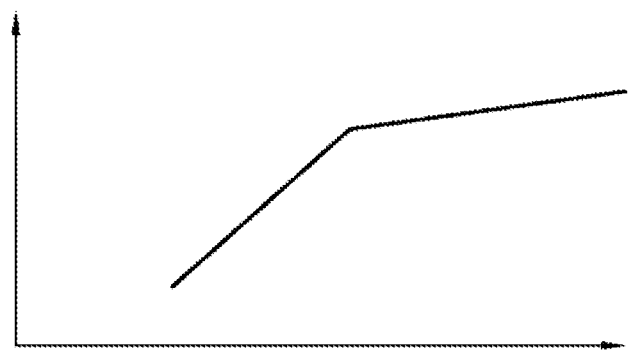

FIG. 13 is a diagrammatic view of one form of stops, limiting the rotation of the flap and comprising two pairs of stops on the stationary structure and on the movable flap, each stop pair limiting the rotation of the flap in one direction; and FIG. 14 shows a curve illustrating the typical behavior of two springs having two different stiffnesses, said stiffnesses being obtained by having either one or two active springs on each segment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
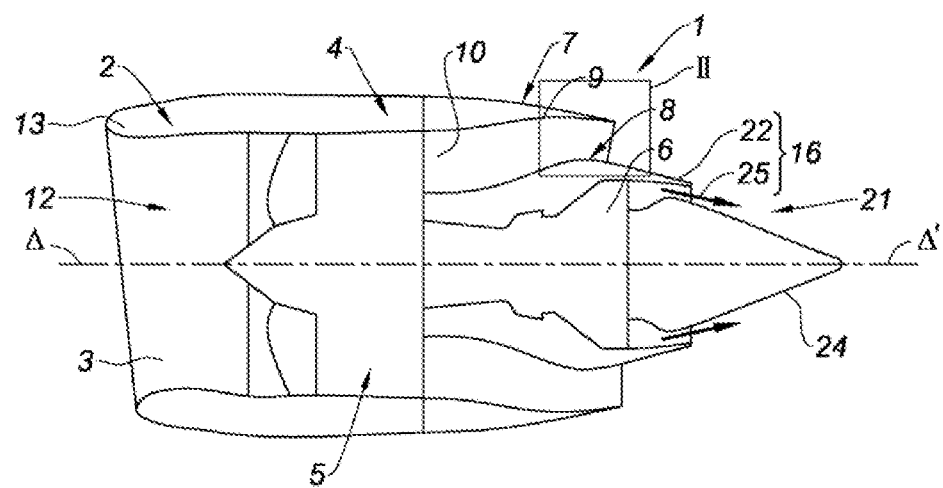
FIG. 1 is a partial diagrammatic cross-section of one form of a nacelle according to the present disclosure.

As shown in FIG. 1, a nacelle 1 according to the present disclosure has a substantially tubular shape along a longitudinal axis A. The nacelle according to the present disclosure 1 comprises an upstream section 2 with an air inlet lip 13 forming an air inlet 3, a midsection 4 surrounding a fan 5 of a turbojet engine 6, and a downstream section 7. The downstream section 7 comprises an inner structure 8 (generally called "IFS") surrounding the upstream part of the turbojet engine 6, and an outer structure (OFS) 9 that can support a moving cowl including thrust reverser means.

The IFS 8 and the OFS 9 delimit an annular flow path 10 allowing the passage of a flow of air 12 penetrating the nacelle 1 at the air inlet 3.

The nacelle 1 ends with a jet nozzle 21, called primary nozzle, comprising an outer module 22 and an inner module 24. The inner 24 and outer 22 modules define a flow channel for a hot air flow 25 leaving the turbojet engine 6.

Figure 2:
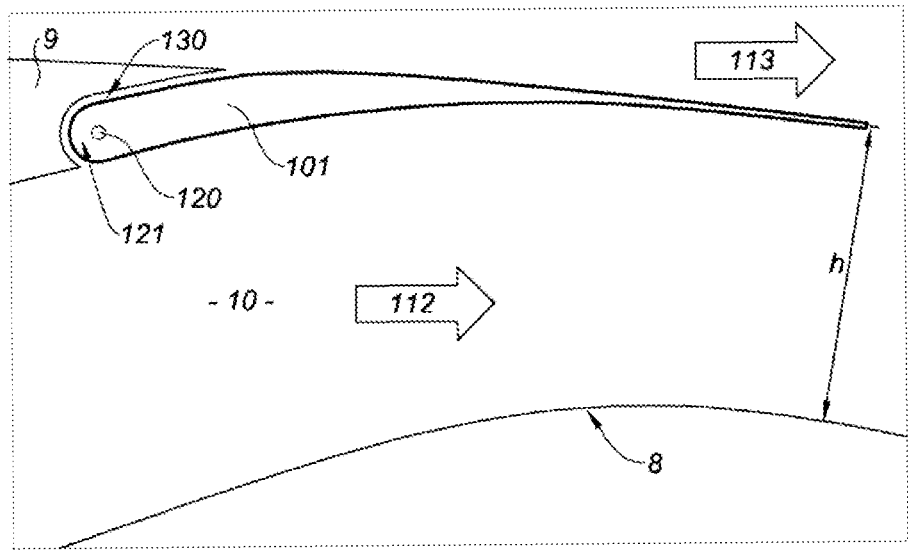
FIG. 2 is a partial diagrammatic cross-section of an enlargement of zone II of FIG. 1, whereof the nacelle includes one form of a movable flap in an increasing position.

As shown in FIG. 2, the outer structure 9 comprises at least one movable flap 101 positioned at the downstream end of the outer structure 9 and across from the annular flow path 10, each movable flap 101 being rotatable so as to go from a position increasing or reducing the height h of the section of the annular flow path 10 relative to an idle position solely under the action of the pressure exerted on said movable flap 101 by the airflow 112 circulating in the annular flow path 10 across from said movable flap 101 and the airflow 113 circulating outside the nacelle, said movable flap 101 being able to return from one increasing or reducing position to another position owing to the elastic return means.

The nacelle 1 according to the present disclosure can therefore have an output section of the variable-section nozzle based solely on the pressure exerted by the air flow 112 circulating in the annular flow path 10 and the outer air flow 113, or in other words, based on the flight phase.

In fact, the pressure exerted by the air flows 112 and 113 depends on the load case. Thus, during takeoff, the pressure on the flap 101 is increased to become maximal at a typical reference value of 50,000 Pa.

During the cruising phase, this pressure is lower and is typically comprised between 35,000 and 25,000 Pa. During the landing phase, this pressure decreases further to reach a pressure comprised between 15,000 and 5,000 Pa.

According to these flight and therefore pressure conditions of the air flow 112, the movable flap 101 pivots along its pivot axis 120, typically situated at the upstream end 121 of the movable flap 101. As a result, the height h of the section of the annular flow path 10 is increased or reduced under the combined action of the pressure and the elastic return systems.

More specifically, the pressure exerted by the air flow of the flow path 112 and the different components of the outer air flow 113 (for example: airplane speed, angle of attack, gusts, etc.) on the flap can therefore have an effect on the movable flap 101 greater than that of elastic return systems, such that said flap 101 pivots to increase the height h. Likewise, the effect of these pressures can therefore have an effect on the movable flap 101 lower than that of the elastic return systems, such that said flap 101 pivots to decrease the height h.

The present disclosure therefore makes it possible to obtain a variable-section nozzle not actuated by a cumbersome and heavy device outside the movable flap 101. Likewise, savings are thus obtained in terms of mass and space.

Furthermore, advantageously, the movable flap 101 can assume continuous and non-discrete positions that are only influenced by the value of the pressure exerted by the air flow 112 and 113 as well as by the stiffeners of the elastic system. Consequently, the height h of the section of the annular flow path 10 is adjusted precisely based on the needs of the nacelle 1 to improve the performance of the latter.

Figure 3:
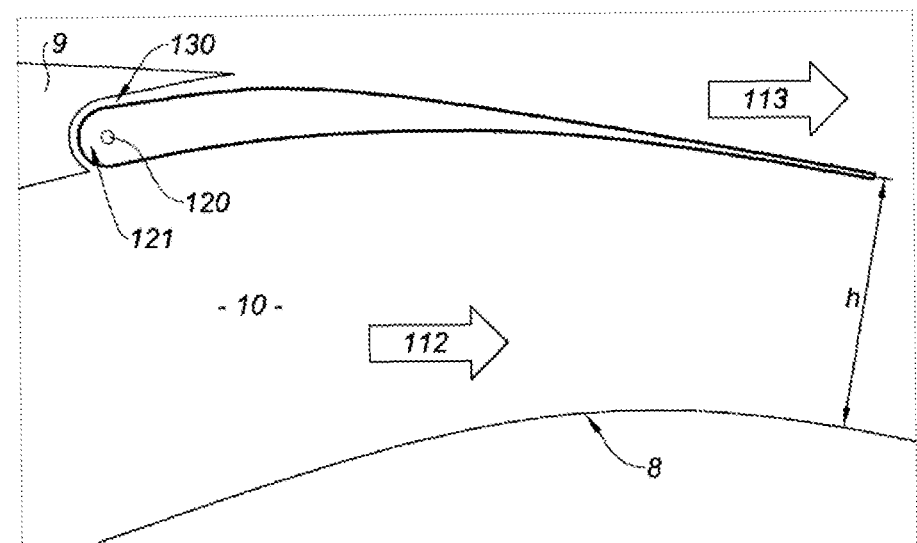
FIG. 3 is a partial diagrammatic cross-section of the form of FIG. 2, in which the movable flap is in its position decreasing the height of the section of the annular flow paths.

Typically, the movable flap 101 is mounted aerodynamically continuously at the downstream end of the outer structure 9 so as not to have an impact on the performance of the nacelle 1. To that end and as shown in FIGS. 2 and 3, an upstream part of the flap 101 can be positioned in a cavity 130 provided in the outer structure 9.

The angular travel of each flap 101 may typically be comprised between −4° and +4° relative to the idle position. The variation of the height h can therefore be comprised between +30 mm and 30 mm. The length of each movable flap 101 can be comprised between 300 mm and 1000 mm. These values are provided purely for information and are not limiting on the performance and characteristics of the present disclosure.

The elastic return means can be positioned at the upstream end 121 at the pivot axis 120 of the movable flap(s), which allows good pivoting of each movable flap 101.

The elastic return means can comprise one or more springs configured to oppose the momentum exerted by the pressure of the air flow 112 in the annular 10 and outer 113 flow path, which makes it possible to position each movable flap 101 properly, simply and reliably.

The elastic return means can include two springs placed in opposition so as to obtain a desired stiffness, the stiffness profile in particular optionally being able to include an operating zone with a non-active spring so as to have a non-constant slope of the stiffness curve and thus define different operating ranges (FIG. 14, for example). This makes it possible to obtain a variable section nozzle with three or more positions based on the stiffness of each spring.

The elastic return means can include two springs placed in parallel optionally including an operating area with a non-active spring so as to have a non-constant slope of the stiffness curve, which makes it possible to obtain a variable-section nozzle with three positions based on the stiffness of each spring.

Of course, the nacelle 1 may comprise elastic return means in the form of one or more springs, as previously described, as well as one or more movable flaps.

Each movable flap 101 can be associated with one or more radial stops positioned so as to limit the angular movements of said movable flap. A stop can, for example, assume the form of a protuberance on which the movable flap 101 can abut.

The nacelle 1 can further include blocking means configured to block a movable flap 101 in at least one of the increasing and reducing positions. The blocking means can for example assume the form of locking fingers, in particular having specific actuation.

Figure 4:
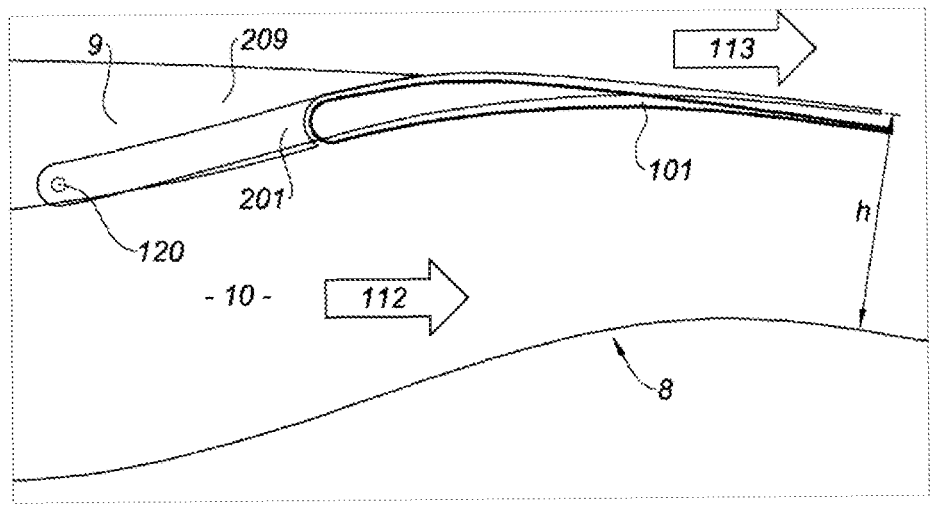
FIG. 4 is a partial diagrammatic cross-section of an alternative of the form of FIG. 2.
Figure 5:
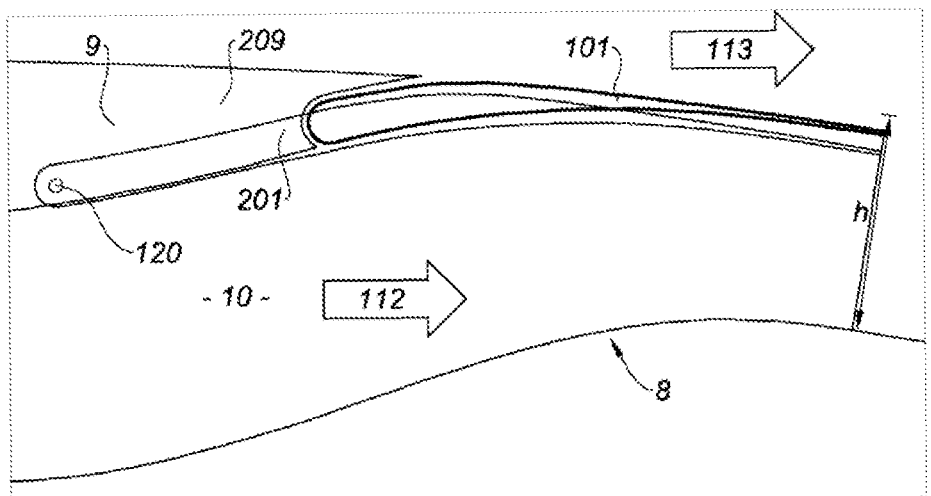
FIG. 5 is a partial diagrammatic cross-section of one alternative of the form of FIG. 3.

As shown in FIGS. 4 and 5, at least part of the movable flap 201 is substantially covered by part 209 of the outer structure, which makes it possible to increase the size of the movable flap 101 and therefore facilitate its rotation.

Figure 6:
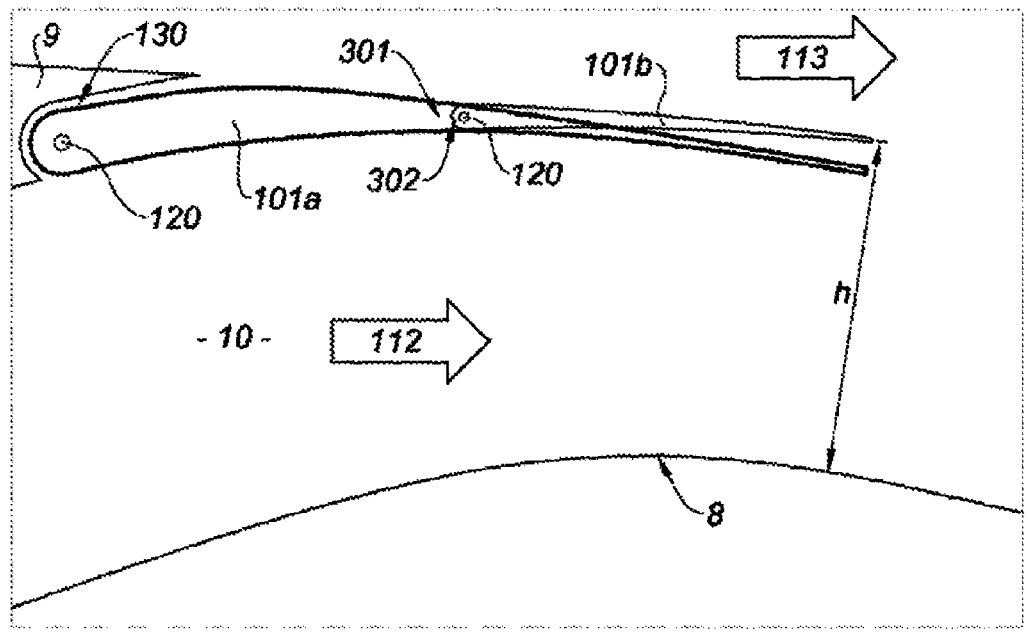
FIG. 6 is a partial diagrammatic cross-section of another alternative of the form of FIG. 2.
Figure 7:
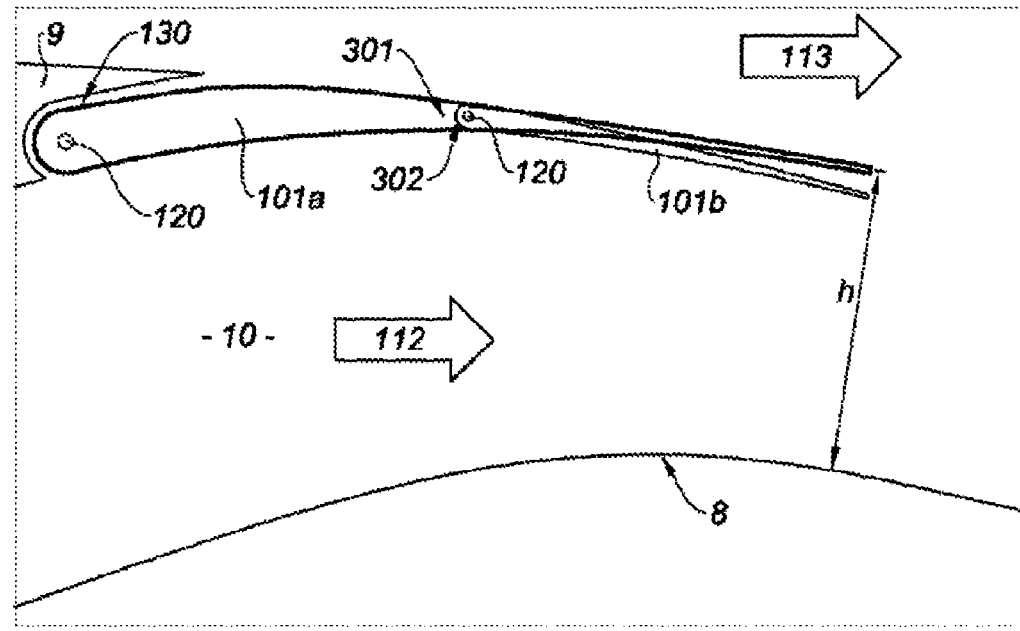
FIG. 7 is a partial diagrammatic cross-section of another alternative of the form of FIG. 3.

As shown in FIGS. 6 and 7, the upstream end 302 of one removable flap 101b can be fastened to the downstream end 301 of another movable flap 101a, the two movable flaps 101a, 101b being in aerodynamic continuity.

The movable flap 101b positioned furthest downstream can be shorter than that of the movable flap 101a positioned furthest upstream form the outer structure 9.

Figure 8:
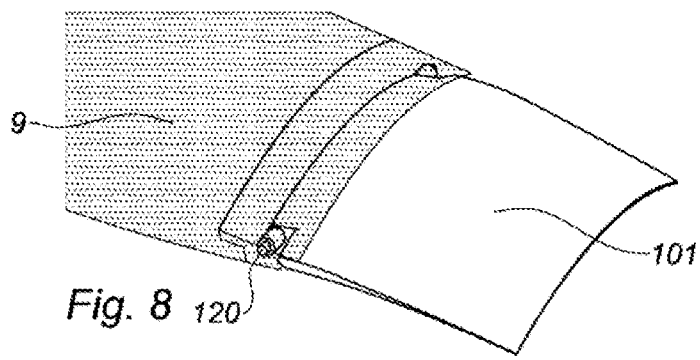
FIGS. 8 and 9 are perspective views of the flap/stationary structure assembly provided with a torsion bar-based elastic system.
Figure 9:
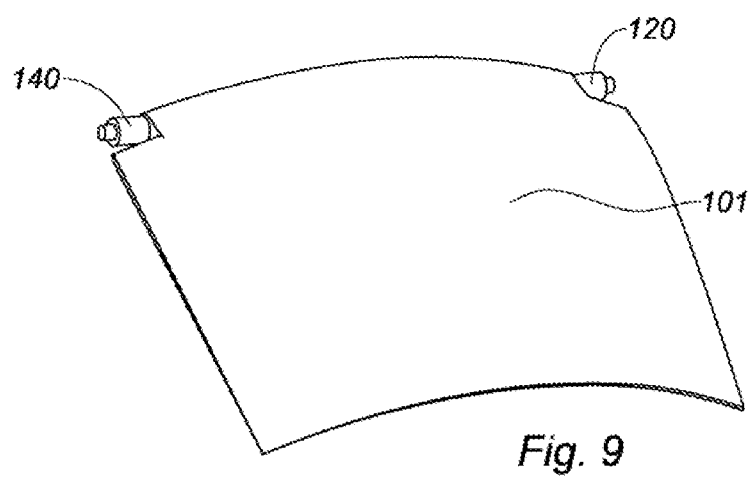
Figure 10:
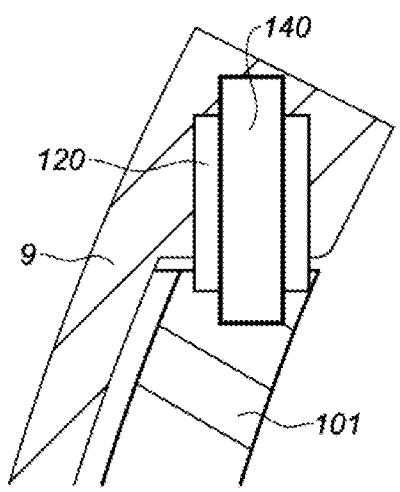
FIG. 10 is a longitudinal cross-sectional diagrammatic illustration of a first form of a flap system of FIGS. 8 and 9.

According to specific forms shown in FIGS. 8 to 10, these elastic return means can for example be a torsion bar 140. This torsion bar 140 is blocked in rotation on the stationary structure 9 and on the movable flap 101, for example using splines, flats, pins, keys, friction via a collar, etc. (means not shown). This torsion bar may be solid or hollow. In the illustrated example form, this torsion bar is associated with a hollow pivot axis 120, the function of which is to transmit the forces from the movable flap 101 to the stationary structure 9, other than the torsion moment reacted by the torsion bar 140. It should be noted that this pivot axis 120 can be mounted with a ball joint (not shown).

Figure 11:
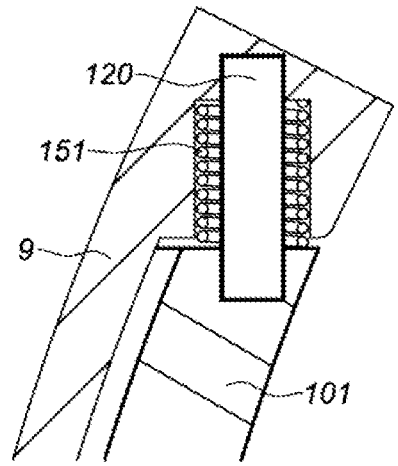
FIG. 11 is a longitudinal cross-sectional diagrammatic illustration of a second form of a flap system of FIGS. 8 and 9 using torsion springs.

As shown in FIG. 11, one alternative of these elastic return means can be a torsion spring 151, associated with a pivot axis 120. In this alternative, the spring is fixed at one of its ends on the stationary structure 9 and at the other end on the movable flap 101. The pivot axis 120 transmits the forces from the movable flap 101 to the stationary structure 9, other than the torsion moment reacted by the spring. This pivot axis 120 can be mounted with a ball joint (not shown).

The elastic return means can be a combination of several elementary means, including (non-limiting list) a spring, torsion bar, flexibility of the structure, etc.

Figure 12:
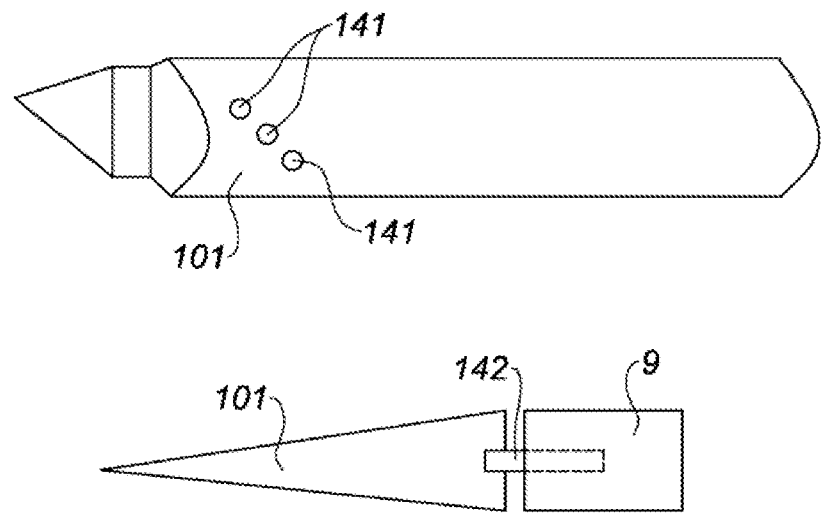
FIG. 12 is a diagrammatic view of one form of blocking means for the flap, made up of one or more active locking fingers entering dedicated piercings.

As shown in FIG. 12, the flap(s) 101 can be equipped with blocking means, locking the function of the variable nozzle and for example comprising one or more active locking fingers 142 entering dedicated piercings of the outer structure 9.

As shown in FIG. 13, the flap 101 can be equipped with stops 143, 144 so as to limit the rotation of the flap 101 and/or allow it to adopt discrete positions. To that end, two sets of stops 143, 144 are provided on the movable flap 101 and the stationary structure, respectively, each stop pair limiting the rotation of the flap in one direction.

The elementary elastic return means can be combined to have several stiffnesses per bearing as shown diagrammatically in FIG. 14, for example by having angular sectors on which the springs are not active. This function may be obtained by stops for stressing the springs.

Of course, the features described in the context of the forms described above can be considered alone or combined with each other without going beyond the scope of the present disclosure.

What is claimed is:

1. A nacelle for an aircraft bypass turbojet engine, comprising:
   a downstream section comprising an inner fixed structure surrounding part of the aircraft bypass turbojet engine, and an outer structure at least partially surrounding the inner fixed structure so as to define an annular flow path along which an air flow circulates, the outer structure comprising at least one movable flap positioned at a downstream end of the outer structure and positioned facing the annular flow path,
   wherein said at least one movable flap pivots along a pivot axis of an elastic return device which directly connects said at least one movable flap to a stationary part of the outer structure at an upstream end of said at least one movable flap, and wherein each of said at least one movable flap under an effect of the elastic return device is configured to inwardly or outwardly rotate in a radial direction so as to move into a position that increases or reduces a height (h) of a cross-section of the annular flow path in relation to an idle position, in response to pressures exerted on said at least one movable flap by the air flow and by an outer air flow circulating outside of the nacelle.

2. The nacelle according to claim 1, wherein the elastic return device comprises one or more springs configured to oppose pressures exerted on said at least one movable flap by the air flow.

3. The nacelle according to claim 1, wherein the elastic return device includes two springs placed in opposition.

4. The nacelle according to claim 1, wherein the elastic return device comprises two springs placed in parallel.

5. The nacelle according to claim 2, wherein the one or more spring(s) comprise one or more torsion spring(s).

6. The nacelle according to claim 2, wherein the one or more spring(s) comprise a torsion bar.

7. The nacelle according to claim 1, wherein each movable flap is associated with one or more radial stops positioned so as to limit angular movements of each movable flap.

8. The nacelle according to claim 1, further comprising at least one finger configured to block said at least one movable flap in the position.

9. The nacelle according to claim 1, wherein at least one part of said at least one movable flap is covered by the outer structure.

10. The nacelle according to claim 1, wherein an upstream end of another movable flap is fixed to a downstream end of said at least one movable flap, said at least one movable flaps being aerodynamically continuous with said another movable flap.

\* \* \* \* \*